(12) United States Patent
Herz

(10) Patent No.: US 8,046,835 B2
(45) Date of Patent: Oct. 25, 2011

(54) DISTRIBUTED COMPUTER NETWORK SECURITY ACTIVITY MODEL SDI-SCAM

(75) Inventor: Frederick S. M. Herz, Warrington, PA (US)

(73) Assignee: Frederick S. M. Herz, Milton, WV (US)

( * ) Notice: Subject to any disclaimer, the term of this patent is extended or adjusted under 35 U.S.C. 154(b) by 805 days.

(21) Appl. No.: 10/693,149

(22) Filed: Oct. 23, 2003

(65) Prior Publication Data

US 2004/0083129 A1    Apr. 29, 2004

(51) Int. Cl.
G08B 23/00    (2006.01)
(52) U.S. Cl. .......................................... 726/25
(58) Field of Classification Search ............... 726/25
See application file for complete search history.

(56) References Cited

U.S. PATENT DOCUMENTS

| | | | |
|---|---|---|---|
| 6,405,250 B1 * | 6/2002 | Lin et al. ....................... | 709/224 |
| 6,405,318 B1 * | 6/2002 | Rowland ......................... | 726/22 |
| 6,775,657 B1 * | 8/2004 | Baker ............................ | 706/45 |
| 7,152,105 B2 * | 12/2006 | McClure et al. ............... | 709/224 |
| 2003/0002436 A1 * | 1/2003 | Anderson et al. ............. | 370/218 |

* cited by examiner

Primary Examiner — Kambiz Zand
Assistant Examiner — Aubrey Wyszynski
(74) Attorney, Agent, or Firm — Woodcock Washburn LLP

(57) ABSTRACT

A distributed multi-agent system and method is implemented and employed across at least one intranet for purposes of real time collection, monitoring, aggregation, analysis and modeling of system and network operations, communications, internal and external accesses, code execution functions, network and network resource conditions as well as other assessable criteria within the implemented environment. Analytical models are constructed and dynamically updated from the data sources so as to be able to rapidly identify and characterize conditions within the environment (such as behaviors, events, and functions) that are typically characteristic with that of a normal state and those that are of an abnormal or potentially suspicious state. The model is further able to implement statistical flagging functions, provide analytical interfaces to system administrators and estimate likely conditions that characterize the state of the system and the potential threat. The model may further recommend (or alternatively implement autonomously or semi-autonomously) optimal remedial repair and recovery strategies as well as the most appropriate countermeasures to isolate or neutralize the threat and its effects.

18 Claims, 1 Drawing Sheet

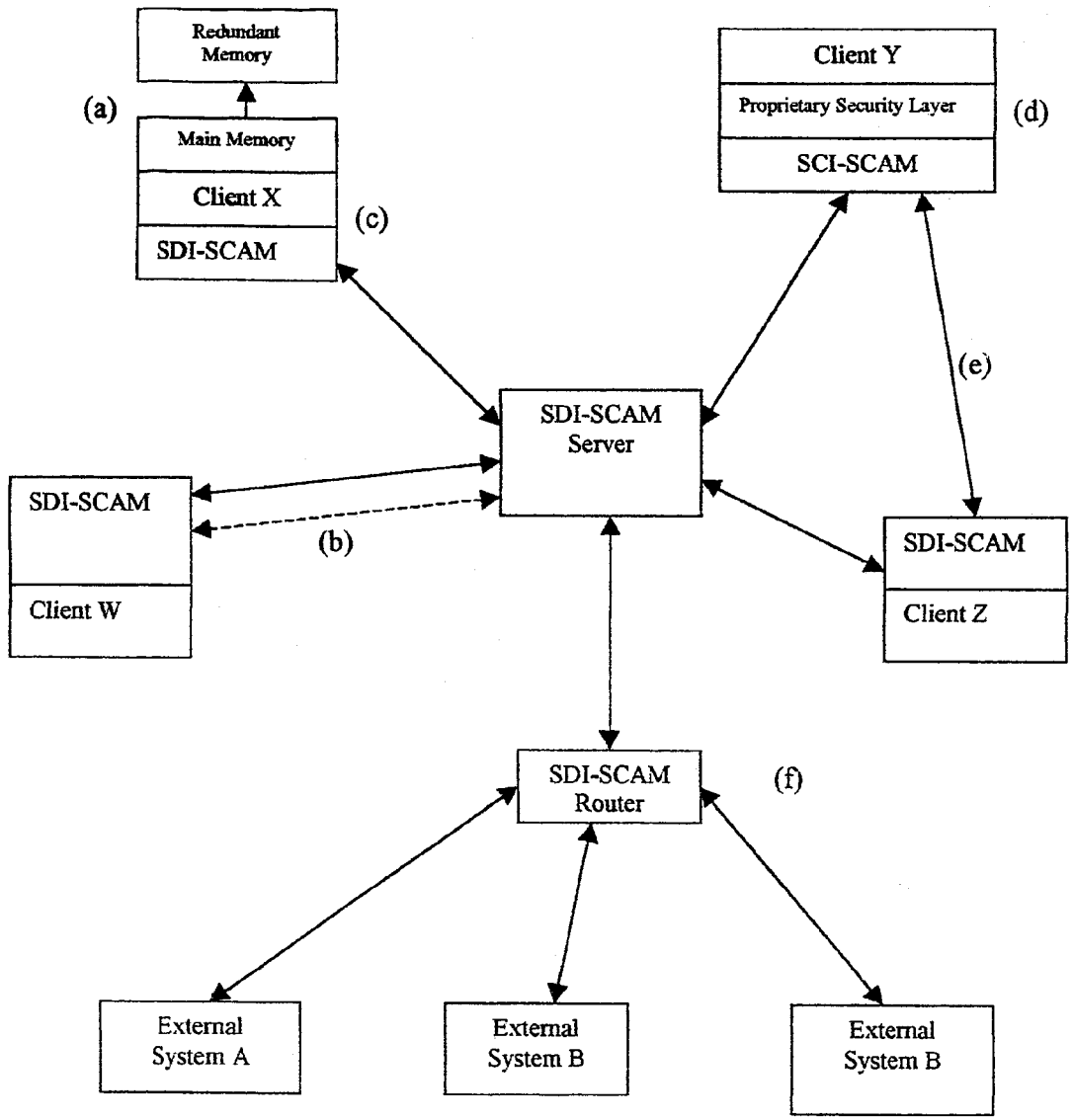

DISTRIBUTED COMPUTER NETWORK SECURITY ACTIVITY MODEL SDI-SCAM

FIELD OF THE INVENTION

The invention relates to a system and method for detecting the condition of a computer network and identifying threats to the network using passive data analysis techniques.

SUMMARY OF THE INVENTION

The invention is characterized by the following features:

1. Agents are installed at user (e.g. client), ISP and/or private network levels. One possible configuration enables agents to also be implemented centrally.

2. Different functions and activities are assigned to different agents. Each locally implemented version of SDI-SCAM may vary, thus not every agent/function is the same for every system implementation and not every agent is utilized for every system implementation.

3. Agents are linked together in a network. A "network" may be wide-scale distributed agent mediated information analysis and defensive response system or a small sub-network such as a coalition of organizations, a single organization and/or even a subdivision within an organization. The network may be further characterized by:

a. Redundant connections may be a prudent design consideration so that a really bad virus taking down a system will not prevent the system's agent from sending out a warning.

b. Redundant memory/hardware and associated processing capacity which can quickly become insulated from the infected and/or corrupted portions of the system may be able to function synergistically with system's analysis and the present early warning detection schemes as herein disclosed. Relatedly, such redundancy may enable a system to more readily "undo" certain processing routines and other actions if early warning detection is sufficiently expeditious and highly accurate as the presently proposed methodology attempts to achieve.

c. Architectural Flexibility is provided so as to enable communications between SDI-SCAM agents implemented on heterogeneous types of traditional computer security systems and/or with that of a centrally implemented version of SDI-SCAM.

In one very practical and efficacious incarnation of the present broad-based methodology, it is particularly prudent in many practical implementations to use the broad definition of "agent" as it is presently used within the context of the below-described system implementation to encompass (as appropriate to the particular context) security system functionality which is implemented as part of potentially any heterogeneous variation of traditional computer/network security systems that are designed to communicate with other agents that are part of SDI-SCAM and/or implement actions on their behalf. These other SDI-SCAM agents may, of course, be directly associated with that of a centrally implemented version of SDI-SCAM. Any type of associated agents constituting SDI-SCAM may at various phases or conditions of their use possess or embody certain functions that are able to function separately, and independently of one another or the entire SDI-SCAM system or alternatively as interoperable systems within the context of SDI-SCAM's distributed multi-agent architecture. In this context, SDI-SCAM may operate and appropriately interoperate as a collection of agents that are functionally defined and whose functional purpose is exclusive to SDI-SCAM at a distributed multi-system level. Because certain informatic data collected at the machine or system level that may be of relevance to SDI-SCAM may be potentially too sensitive to release to SDI-SCAM, alternatively individual agents, e.g., representing a collection of machines, local systems (e.g., within an organization) or even organizations may for a coalition with which to exchange certain types of data based on the functional objectives of SDI-SCAM. Thus it is conceivable that the structure of multi agent systems and disclosure rules/constraints of these agents to other agents may tend to be based upon a hierarchical structure in which data transmission and general communications from the bottom level agents to those at the higher levels tend to be more limited than top down communications, both in terms of specific data disclosure at a detailed level. Aggregative statistics and recommendations for defensive response operations, however, by top level agents tending to act more on behalf of the distributed network level and central SDI-SCAM would tend to perform communications to lower level agents, however, in top down fashion, thus making them asymmetrical interoperable systems within the larger scale context of SDI-SCAM. Furthermore, agent functionality could wherever it is appropriate and necessary provide the necessary multi system agent-agent interoperability platform, which is designed and implemented to achieve the overall functional objectives of SDI-SCAM which may itself be implemented at a local/regional level and/or a general network-wide level and in the form of either a centrally designed architectural configuration (i.e., containing some centrally located server(s) and/or in distributed fashion, i.e., where the agent code is physically implemented at the individual system level and/or machine level. Consideration toward incorporation of such multi-system level transparency thus lends a very considerable degree of architectural flexibility to the present system.

The interoperability (or middleware) facilities that the multi-agent network provides enable the various suites of unique and enhanced anti-threat functions as herein disclosed within the present complete distributed SDI-SCAM system. However, for the sake of practical convenience of organizations and end-users which are part of the SDI-SCAM network and for the sake of efficiently utilizing potentially any/all pre-existing computer security infrastructures as installed it is an advantageous and judicious design consideration to enable SDI-SCAM architecture to possess the innate flexibility to be able to be built on top of other or otherwise existing non-distributed computer/network security platforms that may be installed in order to provide a means for synergistically and symbiotically enhancing the efficiency and rapidity of all existing detection, defensive, remedial and reparative functions of the existing system security installation as well as to add additional useful features by virtue of the system's unique multi-agent security approach. In this way, the pre-existing system security installation is able to operate independently and completely synergistically to that of SDI-SCAM while retaining its own unique and/or custom tailored functionality incorporating its own type(s) of defensive, preventive, remedial and/or reparative functions that can be passively or possibly even actively controlled or adjusted and enhanced by the present distributed multi-agent system constituting a general (network-wide) or regional (closed proprietary) implementation of SDI-SCAM. As such, a primary software-level achievement of the SDI-SCAM system is to enable the needed seamless communications between each security system and that of any other individual traditional security system's application protocol (which may, of course, include a generically implemented protocol for SDI-SCAM itself) and those protocols associated with the other types of security implementations that have been recruited for use within the distributed system architecture of the SDI-SCAM security system.

Several unique characteristics and functional features may be associated with an agent that is implemented as part of the present multi-agent distributed system. Some of the system advantages associated with such interoperability capabilities include, but are not limited to:

i. Interoperability between any heterogeneous protocols which are each associated with a security system on the SDI-SCAM distributed network.

ii. Several cardinal interoperability functions of each locally installed agent includes providing interoperability between potentially any heterogeneous system protocol which is associated with a security system and the generic system-level protocol associated with SDI-SCAM (as a protocol in and of itself).

iii. Enabling agent communications between each associated security system which is implemented locally and the SDI-SCAM distributed network (e.g., for outgoing data regarding at least certain local system-level events and actions, at a minimum).

iv. Other implementation-level variations:

Enabling agent implementations that operate at a local system level (e.g., may be readily and practically implemented through the use of hooks or plug-ins for SDI-SCAM associated with each locally installed computer/network security system until/unless a standardized protocol evolves that supports the present distributed system paradigm.

A non-distributed agent typically one-way (upstream) communications protocol in which an agent simply passively observes and uploads transmission data to a centralized (or other locally distributed analysis agent).

d. Inter Agent Data Exchange Based upon Data Exchange and Release Policies

The term "agent" as herein defined within the context of locally installed agents may, depending on the specific design considerations of any given local implementation of SDI-SCAM, be capable of a variety different functions including analytic functions and associated secure auditing/reporting functions (such as to human and/or autonomous operators each operating locally or as part of the broader implementation the central SDI-SCAM system). In addition, defensive and counter-offensive responsive actions to a threat may be performed in a fashion which is autonomous, manually executed or semi-autonomously executed and/or a locally implemented agent may simply perform passive monitoring and relay of auditable data from the local system. In its above-mentioned use in an analysis capacity, such as for purposes of purely informatics/data modeling and/or notification, classification, updating of the data model, etc, the actual analytic operation of such an agent may occur in a local server in distributed fashion, at a regional data warehouse (regionally distributed) or at a central SDI data warehouse. On the other hand, an agent may exist and function relatively (or completely) independently of other agents. For example, it may only choose to receive informatic data from other agents or the general SDI-SCAM system or only release informatic data as an exclusive "data provider" to SDI-SCAM. An agent performing this function may filter only releasing certain "non-sensitive" informatic data to other agents and/or the distributed network comprising the central SDI-SCAM system. The possibility must also be considered in which the system's data collection and analytical processing of certain locally acquired data is performed by a local agent and whose external release to another agent(s) or SDI-SCAM is restricted based upon the preferences or requirements of the local system administrator (e.g., which may be revealing of secret proprietary contents, access patterns of high security clearance individuals who may be privy to certain highly sensitive files or highly secure areas of the internal network, etc.). In this case, restrictions as to release of certain data may be predicated upon certain conditions based rules such as what is the classification or characteristics of the subject data, to what entity or type thereof, is there an identified need to receive the subject data, what is the associated agent's expressed intended usage statement for that data, and does such usage require disclosure to that entity per se?

Another approach is to obscure and/or obfuscate certain key characteristics of the data itself. Certain informatic data could be exported to the constituent agents and/or the central SDI-SCAM system only as preprocessed statistics or, for example, statistical aggregates containing randomized values and/or which are ad-mixed with data from other local system sources whose identities may be concealed in order to thus obscure the actual source and/or uniquely revealing details or uniquely traceable identifying patterns or signatures of the data or its associated trail of system users.

Informatic data may also be withheld from release, e.g., to particular entities based upon any number of selected variables, a few simple examples of which might possibly include:

1. The probability of readily and practically a threat existing and/or being a certain level of severity.

2. It is determined to be highly probable that for SDI-SCAM to gain access to the subject data to be released for statistical processing with its own data statistics (i.e. using informatic data from the present local system in combination with other remote data) would result in SDI-SCAM's ability to gain statistical knowledge which could improve the present system's detection (including reduction of "false positives"), classification, defense i.e., effectiveness in defending successfully against the present (or other likely) threats and/or remedial actions corresponding to the possible threat Another important consideration regarding data release is the fact that when a local agent negotiates with another agent(s) associated with SDI-SCAM for data exchange, the associated central or regional SDI-SCAM with which it is negotiating may use "strong" negotiating tactics, i.e., because it possesses statistical data aggregated from multiple sources, the potential value of this data to the local agent is much greater (particularly if the local agent's statistics are statistically correlated with the associated statistical data model of SDI-SCAM). Because SDI-SCAM's most efficient and advantageous approach involves creating an associated data exchange market, although the proposed data benefits to be provided by SDI-SCAM in exchange for the data to be released by the local agent should be weighed on a case by case basis, in the preponderance of cases the release of data by the local agent is likely to be of greatest resulting benefit (compared to the associated privacy risks) on behalf of the local agent.

Overview of Key Objectives of System Architecture

The following set of key system objectives help to address the presently presented problem which threatens system security. It is well known within the field of computer security that the importance of these objectives is matched only by the challenge that they present. Some of these include the following:

a. Detect and classify threats. Ascribe an overall probability level and send out an alert if critical probability thresholds are breached.

b. Assuming the threat exists, what are the probabilities (or probability distribution) that the threat poses certain degrees of potential danger, e.g. ranging from mild to very grave. Of possible relevance in this regard is:

i. Determine the degree of vulnerability to which the threatened system is subjected by the present threat where "vulnerability" is estimated in relation in part to the effective defensive and counter offensive means that are available and which would be effective against that specific threat which exists (or is predicted to exist). One simplistic example of a very vulnerable system is a case in which it is believed that the threat includes a hacker (or rogue script) who is predicted to possess an intimate level of knowledge (or be designed based upon the use of such knowledge respectively), i.e., as a result of intimate familiarity with the present system.

ii. Determine the predicted type of objective(s) and the overall degree of mal-intent which is observed and/or inferred on the part of the individual or organization from which the threat may be originating.

iii. Track origin of threat to likely originating entity (e.g., individual, organization, rogue script).

iv. Anticipate and if appropriate perform appropriate notifications as to which other individuals, organizations and other nodes are likely to have been or are currently being subjected to the threat.

Examples of classifier attributes that may appropriately exemplify some of the types of threat classifications criteria suggested above (which are typically of a probabilistic type) may include, but are not limited to:

Likely/potential individuals or coordinated groups of individuals;

Likely/potential organizations or interests represented by the threat; and

Relatedly, the possible underlying intentions or objectives of this associated underlying entity or interest.

c. Alert and Notification Features—The warning system provided by SDI-SCAM may be activated in response to any variety of possible criteria of notification indicative that the security of the present system may have been compromised (which may, in turn, be variables affecting the overall probabilistic determination for both exposure to and actual infiltration by a given threat). These may include (but are not limited to) the following parameters (as weighted attributes):

i. Probability that the communication with an entity has occurred (given the probabilities);

ii. Probability that the system/entity which has communicated with the present system/entity possesses a given threat(s) (given the probability of i).

iii. Probability of a known or unknown communication(s) imposing a threat upon the present entity (given the probability that the communicating associated known or unknown entity possesses the threat as suggested in ii).

iv. Probability that a given threat to which the present system/entity has been exposed has actually violated and/or compromised the integrity of the present computer system or network (given the probability of iii and given the defensive characteristics of the present system relative to the particular type(s) of possible threat(s) which are presently likely to exist).

d. Select and deploy an optimally suited defense scheme customized for the threat based upon all determinable behaviors, characteristics, and conditions of the threatened system(s) as well as those of the identified threat, provide an appropriate remedial countermeasure based upon the same criteria.

e. Document all observations regarding the type of structure and functional characteristics of the intrusive entity and that of the system(s) with which it interacts, update/refine statistical models accordingly, in order to optimize overall system level intelligence so as to improve the above described operations for detection, classification, tracking, determination of origin and intent as well as associated defensive/counteroffensive measures, etc., The above system objectives are most effectively achieved by implementing a version of the system wherein sharing of critical data can be performed in distributed fashion and can be performed by and between the most likely relevant servers and networks at the most critically important times and in dynamic fashion. Furthermore, the above system objectives are most efficiently achieved by employing statistically-based predictive modeling techniques which are themselves implemented in the form of an associated distributed architecture which is capable of dynamically responsive network-wide remote polling, statistical processing and data redistribution/updating capabilities.

BRIEF DESCRIPTION OF THE DRAWING

The FIGURE demonstrates some of the architectural features of the invention, including (a) redundant memory within a given machine, (b) redundant connections between clients and servers, (c) SDI-SCAM installed as a primary security system, (d) SDI-SCAM piggybacking on an existing security system, (e) direct client-to-client agent communications, and (f) on a router.

DETAILED DESCRIPTION OF THE INVENTION

The algorithms implemented by the invention include:
a. Detection-Bayesian Belief Network
b. Prediction of behavior (e.g., of a virus or worm)-Bayesian Belief Network, Statistical techniques for modeling patterns based on sequentially occurring behavior patterns.
c. Classification
  i. Bayesian Belief Network
  ii. Pattern matching nearest neighbor (in order to determine closest category based upon similarity of its constituents).
  iii. Statistical techniques for detecting patterns based on sequentially occurring events.
d. Immune Response of System
The features and attributes of the resulting system include:
  i. Actions of virus.
  ii System (or SDI-SCAM) responses to actions of virus.
  iii. Actions of a hacker.
  iv. System (or SDI-SCAM) responses to actions of a hacker.
  v. Discrete objects as targets of the threat:
  people
  network/organization
  server
  file
  content
  existing worm or virus
  classes for each of the above
  data release policy for each of the above
  vi. Textual and other multi-media content features
  vii. Classification of the threat
  viii. Potential triggers of the virus or threat (e.g., activation, replication, communications, exportation, important)
Links Connect to Servers (e.g., Data Warehouse(s), Gateways and/or Peers)
The SDI-SCAM servers perform the following functions:
a. Collection and analysis of distributed data—Servers filter and analyze incoming signals, collecting pooled information from agents.
b. Notification to multiple agents—If warning or alert is warranted, server sends it back down the line to agents. In one variation, the present multi agent system functions effectively as a truly distributed agent architecture such that probabilistic threat suspicion model continually filters, analyzes incoming signals while dynamically redistributing its analyzed data and probabilistic updates reciprocally back to its associated constituent agents.

Example Case Implementation of the Preferred Embodiment from a Procedural Perspective 1. Agents report any suspicious activity/data that exceed suspicion threshold.
2. After any scam/break-in/viral infection is confirmed agent transmits as much log/content/behavioral tracking information as possible in order to determine origin of the problem.
3. Data related to suspicions and confirmed attacks constantly sent back to servers.
4. Servers scan for patterns, correlate with news wires, sysadmin communications, anti-viral and other external databases.
5. Servers determine definite/probable flags for various problems and formulate solutions (human in the loop would be very useful here—sysadmins who have recovered their systems could submit defensive fixes and strategies).
6. New detection routines/security patches/warnings/defensive tactics uploaded to agents. May want to implement some level of security so that potentially compromised systems will not be given access to pooled information (as this might give a hacker information on what is known about him).

Exemplary Applications of a Few Primary Types of Threats which Must be Recognized and Counteracted 1. Hacker break-ins (script kiddies/corporate/terrorist)—Intrusion Detector such as ASID. Pattern analysis may be performed. For example, are similar break-ins/attempted break-ins/peculiar noise being spotted across network? If so, such observations may signal novel or concerted approach to breach security. Thus, distributed and dynamic agent communications among widely distributed agents is particularly advantageous for the above reasons. However, by contrast, newly appearing completely novel threats may appear and the associated possibility of such considered and the associated possibility of such considered, e.g., first time release of a new virus hacker attempt or cleverly crafted stealth break-in attempts or rogue software infiltrating the system by "corporate insiders", (e.g, manually installed rogue software scripts, etc.).
2. Viral infiltration may be recognized and counteracted by:
code analysis
behavior analysis
data, language, content analysis
Protections against mutation/dead ringers
Pattern analysis
Other Wolfram-inspired ideas Because rogue scripts may infect a system and present themselves in a dormant mode (before or after activation mode), the above suggested system objective of documentation and associated reduction thereof to a statistical model of previous intrusions and infections can be used to better anticipate the "triggers" from active to passive modes and vice versa as well as the condition/combinations thereof which most likely had occurred within the context of active threats, assaults, intrusions, spreading, etc. to the system as well as reconstructing the conditions/combinations thereof that are likely to have accompanied any/all of the above events (i.e., modeling and predicting the epidemiological characteristic of the rogue script). Because of the unpredictable and potentially malicious behavioral characteristics of rogue software, it is of additional protective benefit to the system to further insulate the agent layer of the system so that control of it is not seized by the potential threat.

In developing a practical statistical model used in virus defense and remedial actions it is useful to consider various attributes like what attributes of a vaccine were effective against previous viruses possessing the same/similar attributes (of course, these features may be further updated and modified once installed as additional feedback is received regarding its effectiveness and associated behavioral responses, for the vaccine and its associated counter-measures).

3a. Untruthful commercial messages (e.g. Nigerian scam): that is, signal itself isn't dangerous, but content is.
3b. False information/rumors/Hoaxes
Statistics/NLP
Warnings from member agents
Cross-check content against recent news stories discussing scams.
Cross-check names and email addresses in messages against known criminals/hoaxsters and aliases for both/either.
Semantic Analysis (for language patterns consistent with trickery/appeal to risk taking tendencies, naive tendencies and other weaknesses that would predispose individuals to predatory individuals and their associated scams as well as messages directed towards such individuals based upon predisposing characteristics which would potentially be accessible to such individuals (e.g., the elderly, the uneducated), those of limited literacy skills (i.e., to the native language or to effective us of a computer), the persons of status, the unemployed or under-employed, teenagers and those who have been receptive to similar unscrupulous solicitations or hoaxes in the past or otherwise exhibit predisposing characteristics which can be predictively correlated to vulnerability to certain particular types of scams which present statistical relevance to SDI-SCAM.
Other behavioral Data
Overview of Hardware Architectural Configuration The architecture component of the present technical methodology as illustrated in the FIGURE should be viewed with appropriate consideration for optimal flexibility and inclusiveness of any viable configuration of hardware and software components as is needed to perform the presently described functions in distributed dynamic and scaleable fashion. However, due to the unique nature of the application-level context of the present system (which likely attributes a substantial need for greater localized control and security) to any/all data, which is proprietary to the local system or network, the use of a fully distributed server architecture and/or local distributed central data warehouses (defined within SDI) may be particularly appropriately implemented as preferred network architectural variation.

Distributed Architecture Details

Ideally, as indicated, all of the probabalistic (such as Bayesian) analysis and modeling techniques are performed in fully distributed and dynamic fashion thereby assuring that the system's distributed data modeling and associated early warning detection facilities are optimally prepared and familiar with current threats, scams and their most likely associated objectives and modus operendi. In the preferred embodiment of the distributed architecture, all of the nodes on the system periodically become updated vis-à-vis the enabled features of SDI-SCAM's distributed architecture, collecting, pooling and redistributing statistics to and from other agents. If/when a local server's suspicion threshold becomes elevated the updating process is again triggered and thus may typically be automatically carried out among those agents. The present updating process may thus be elicited by triggering of the suspicion threshold at one of the constituent nodes or standard periodic updating. In the former case, a preferential priority should be prescribed by the system in accordance with an overall suspicion level based upon certain criteria which are predictive of any given constituent node on SDI-SCAM's multi-agent distributed system having been subjected to the threat. These preferential priorities may in turn be variables used in an overall formula for:

a. Determining whether and to what degree the need exists to poll a given agent.

b. If so, determining the most appropriate sequence/prioritization of polling and associated selection of server(s) and type of analysis technique which appears to be mandated based on feedback from the currently polled agent(s).

A hierarchical scheme addressing this latter issue is disclosed the methodology for performing statistical data collection, and updating in the most efficient manner possible within a distributed architecture as described below. Based upon the system's determination of predicted level of suspicion for a threat, remedial measures in turn may be accordingly indicated, (e.g., a custom dynamically created vaccine could be developed using techniques based upon adaptive rules which utilize inputs from the distributed agent which possess potentially all forms of relevant data).

As listed below, a few example criteria are provided which may play a role in affecting determination of the need to poll a given remote agent's corresponding node based upon a presently suspected threat. Polling priority may include (but is not limited to) those nodes which the presently threatened node is likely to have recently communicated with directly or (often) indirectly (based upon past communication statistics and network flow patterns in order to determine whether they have been exposed to a particular threat which may exist on a given client network node. A few pre-disposing factors may include:

i. Those which have Recently communicated between each other or among one another;

ii. Those which have recently established a communication link with other nodes which are either the most identically shared or otherwise "related" to those with which, it has established communications so as to maximize the system's ability to predict those nodes for which there has been the most common communication connections with other (identical) nodes. Similarly, considering in this model the history of which nodes and connections therewith have eventuated in associated threats (e.g., as directly or secondarily conveyed).

iii. The greatest degree of "similarity" or alliance to the present entity (e.g., corporate or strategic affiliation/alliance, category similarity, commercial/economic or technical interdependency underlying the business relationship, etc.). Other nodes then secondarily may be updated and reciprocally polled for up to the minute statistical updates as well. These example criteria which may be indicative of potential "similarity" with another node(s) that is suspicious may be of predictive probabilistic value in presaging a certain degree of similar suspicion in the other nodes because:

a. Such common characteristics may be suggestive that recent communications were received from a common source or were exchanged between each other;

b. The associated threat was intended to target systems or servers possessing certain defined characteristics.

The structure of the preferential priority scheme for updating nodes across the entire distributed network which constitute the presently proposed tree-like acyclic graph configuration of the updating scheme (which uses a preferential prioritization scheme using a decision tree) could be constructed with consideration to a variety of exemplary criteria. The updating process within the present context may be elicited by the need to poll a node for further information based on the probability of subjection to a potential threat where key data used to determine this probability may include other nodes with which the present node did or may have communicated (probabilistically) and/or notification data received directly from the node's associated agent. Upon polling and statistical analysis of certain key data from the subject node of possible concern by SDI-SCAM typically conclusions derived from the analysis are transmitted back to the subject node as well as possible recommended defensive and/or remedial responses to be executed by the local agents and any/all appropriate statistical updates which need to be performed at the local level as well as at the general level for SDI-SCAM. Alternatively, it might be the case that some or all of the data on the subject node to be otherwise slated for polling in accordance with the present associated conditions is restricted from disclosure to SDI-SCAM. In such a case the restricted data is instead analyzed by the local data analysis agent. It may be combined at the local analysis agent or (subject to the local agent's data disclosure policy regarding the associated processed data) and it may be uploaded to the analysis agent associated with SDI-SCAM for this purpose. It may, however, be the case in certain instances that SDI-SCAM is only able to recommend certain defensive and/or remedial responses if the data disclosure policies of individual local agents contributing to SDI-SCAM's statistical model do not permit the redistribution of statistical data currently possessed by SDI-SCAM which was derived from their proprietary local sources.

The method for developing an adaptably self configurable optimized acyclic graph for statistical data updating/polling based upon a hierarchical structure is disclosed in issued U.S. Pat. No. 5,754,939, entitled "System for Generation of User Profiles for a System for Customized Electronic Identification of Desirable Objects", and is used in the application context of polling for features and their associated (updated) scalar values as associated with user and target object profiles. The description of that patent application is hereby incorporated by reference. The use of a hierarchical cluster (or alternatively a decision tree is described in this specification) to poll potentially physically distributed nodes for data may be required to add statistical confidence to a portion or branch of the tree (represented as an acylic graph for which there presently exists the condition of sparse data). By direct analogy, this technique could be similarly utilized in the case of the present system, however, in which case the degree of statistical uncertainty (previously measured by the measured degree of sparse data) in the present adaptation be represented by the degree of suspicion as measured at any given node across the distributed agent architecture. In this regard it may be necessary for SDI-SCAM to exchange further detailed level variables with that of the local agent in order to achieve a satisfactory level of statistical confidence regarding whether a potential threat is attempting (or has attempted) to intrude the present system, in addition such a hierarchical decision tree may also introduce to the threat certain selected stimuli and/or emulation of system characteristics so as to be able to elicit associated behavioral response actions on the part of the threat so as to ultimately ascertain an optimal level of statistical data regarding the most important variables in use by the system to classify and quantify the nature and severity of the potential threat (discussed within the present disclosure) which are accordingly incorporated within the queries which constitute the present decision tree.

In this regard, for efficiency's sake, in one preferred variation it is desirable to utilize a particular scheme to quickly poll the feature vectors and other attributes used in the statistical data model based upon a preferential prioritization of those features which are the most relevant to the probabilistic determination of the probability of infection (or subjection to another threat) as well as its likely degree of rogueness). One could envision the efficient use of a decision tree as part of the distributed system which may, for example, be designed to poll agents in order to most rapidly determine the presence and/or discover data relating to the following parameters with regards to providing further useful data to the present predictive data model. Some of those criteria for use in determining preferential priority in SDI-SCAM establishing communications with and updating nodes across the network include:

i. The factors discussed in items i-iii above which include among others:

Patterns of communications particularly very recently with other nodes, which are determined to be the same or deemed "similar".

Communications (particularly very recently) which have been established between those particular agents.

ii. Those nodes which are part of or associated with in some way the same internal network e.g., sharing physical hardware components, geographic proximity, common individuals who directly or vis-à-vis an associated organization affiliation possess common access to the present server or system of subject concern.

(iii). Networks that are particularly vulnerable or have particular holes to be potentially exploited by would-be intruders.

(iv). Networks that contain particularly important and/or sensitive data and/or the consistency and integrity of whose operations are particularly critical for one reason or another, (e.g. economic, financial, utility infrastructure, national security, etc.

(v). What is the likely source and intended destination(s) or types thereof (if any) of a particular suspicious script(s) or hacker(s)?

(vi). Are there any common characteristics or common patterns, transmission/distribution patterns, etc. which exist between different suspicious entities (either the above temporally or otherwise).

(vii). Based upon existing transmission patterns/characteristics, what are the likely destinations that a particular suspect entity likely is, has been or will go (thus forming the basis for destinations which may likely be intruded).

(viii) Attributes (if any are present) which if determined to exist or exceed a certain threshold value effectively eliminate the associated system as a likely candidate for intrusion or viral infections (thus saving time/bandwidth costs associated with modeling and tracking the suspect intrusive entity).

(ix). Attributes which will most quickly/effectively achieve a determination of whether it is "sufficiently likely" that the system has been intruded. At which point, if it is deemed judicious to do so, the decision tree may probe further at a deeper, more comprehensive level of data acquisition in order to attempt to detect the potential presence of commonalities with other likely systems that are likely to have been intruded by the same entity (much like the director of an investigation of a potential criminal event that may be linked to the suspect of a set of serial crimes. Likewise, for a suspected intruder which has been analyzed and profiled to the greatest extent possible poll from those other agents at a high level of detail, which are likely to possess highest degree of historical data pertaining to that particular suspect rogue entity (or type thereof), e.g., as indicated by associated statistical data regarding the rogue entity and associated defenses and remedial techniques that were successful or unsuccessful.

(x). What are the computer system/network (or associated security) characteristics and/or actions or responses (and weighted statistical values which may have elicited the present (or present type of) virus (or other threat) to perform certain actions relating to other systems that were harmful to the present system (or other systems, e.g., as a result of eliciting further spread or mutation of a given virus).

(xi). Are there properties of any given piece of code which have been seen to propagate across the network and/or multiple locally or remote fashion or demonstrate other characteristics of rogue or unwelcome artificial life?

(xii). What piece(s) of code believed to be normal appear to demonstrate the highest probabilistic degree of similarity to a virus (thus code sequence may then become a template to perform deeper analysis of those other pieces of code on local or remote systems to which this heightened probability can be attributed)?

(xiii). Does there exist and if so, what is the sequel of code which contributes (statistically) to the determination of elevated level of suspicion of a threat on another system within SDI-SCAM?

c. Routine maintenance and upgrades to agents done by server. One specific architectural variation in which the associated architecture is devoid of any centralized agent functionality, i.e., it is entirely distributed, will now be described.

General architecture—agents are nodes, servers are hubs.

Scam Detector—Much has been written recently about a variety of annoying and even harmful information disseminated throughout the Internet that ranges from simple propagated rumors, misinformation and inaccuracies to deliberate hoaxes or fraudulent scams with malicious intent to profit at the expense of other people who are duped into believing deceptive promises, claims and other information. Some of the most insidious of the latter include the notorious Nigerian bank account scam, aid to US soldiers in Afghanistan, aid to victims' families of the 9/11 tragedy and a variety of charity based scams. Unquestionably, the most abhorring, and in fact, disturbing form of scam involves those dangerous individuals who exploit use of the Internet's very privacy protecting advantages in order to pose as a type of individual (e.g., a teenage girl) which they are in fact not (e.g., while in fact being a 40 year old stalker or even sexual predator of children). In order to address these problems both individually and collectively, what may be needed is a system which may be implemented at the browser or ISP level, which collaboratively and innocuously combs through both specific content and users' behavioral responses and information oriented responses to such information. Accordingly the system is based upon a statistical model containing statistical and NLP components and operates in a fully distributed and collaborative fashion. It observes and compares information using statistical NLP in order to determine the suspicion thresholds of any given content which fits the basic format of a potential scam. The language model may be based upon a set of adaptive rules which are initially manually inputted and which become refined and modified in accordance with relevance feedback. Examples of sources of these rules may include statistical models of "deceptive information" (perhaps from a training corpus). It may also be based upon other pre-existing scams, which have been clearly identified as such. Of course, there are many sub-categories of scams which fit the definition of a scam and each would be modeled individually, for example, false or exaggerated claims made by spam advertisers (i.e., false advertising) traditional Internet scams, Internet rumors or other false information which could become propagated, etc. Although it is not an extremely likely scenario, such a system could also be used in a protective capacity in which, for example, some rogue entity were somehow able to gain control over the network (e.g., cyberterrorists) and disseminate apparently legitimate information that could result in a panic or frenzy and/or such entity posing, for example as a government authority figure requesting that individual (or the public) to react in a way that could be particularly harmful to an, entity, government, (e.g., an individual, such as a person/leader in a position of authority, a group of people, or an entire nation's national homeland security interest), or for example, such a similar type of system wide seizure could also, for example, be used as a medium through which individuals could be duped into inappropriate disclosure of highest confidential or classified information to the wrong entities or at a system level, convincing another system that appropriate actions permissions which the seized system has access to is sufficient evidence that requested sensitive information is being released to only appropriate individuals, besides the extremely unfortunate and contemptible efforts of unscrupulous individuals to prey upon the fears, concerns, and sympathies of the unsuspecting public in times of tragedy and/or associated fear. What is potentially equally as worrisome is the possibility of such individuals to do further damage, for example, by:

1. Posing as a legitimate (though in reality a surreptitious) organization or individual and causing panic by either initiating a believable rumor or compounding fears which individuals may already have immediately after or during a tragic event or before such a feared tragic event even occurs. (One could easily imagine this very scenario, having taken place immediately following the 9/11 tragedy had the Al Qaeda network had additional funds and/or IT resources at the time). Such hoaxes could be any or all of the following: currently prevailing political concerns (such as threats by feared terrorist networks), particularly surrounding potentially explosive or unstable situations; rumors already circulating or benign versions of existing communications (which are considered "legitimate") transmitted via the news media, the Internet, etc. during or right after a tragic event; and/or taking over a data communication network (which may include electronic news media which is recognized as legitimate and credible).

In addition to content based input, the system may usefully further leverage user response behavioral data as well as content provided by the user in response to the information. The system may also attempt to validate or authenticate the information by tracing it back to its original source, e.g., was it propagated by multiple sequential users, did it accordingly evolve much like the characteristics of a rumor or did it originate from a single individual? If the latter is true, what is the trustworthiness (ultimately, believability) of the individual or organization from which the information originated (e.g., which could be performed by conducting an instantaneous background check on both)? Also, the co-pending U.S. patent application Ser. No. 10/202,302, entitled "Database System for Identifying Potentially Litigious Patients" with a few obvious modifications could be customized for predicting instead of probability of litigious activity, rather probability of an individual to engage in questionable business practices or actual fraud (even if an explicit previous history of the same is not apparently evident at present). This may include the other (legitimate) activities the user is involved in. Corroboration-based techniques may also be useful, e.g., to what degree does the information corroborate with other relevant information sources whose trustworthiness is quantified or what is the degree of corroboration of these other information sources with the present one particularly with relation to similar disclosed information in the past. What is the degree (if any exists) of user complaints about a particular piece of content or information source ("degree" includes prevalence and severity of alleged inaccuracy, untruthfulness or impropriety)? Certainly an appropriate rational approach to determining the nature of a likelihood of content to be of a damaging nature would be to determine these probabilities based upon the characteristics of the content or script itself as well as the identity or likely (inferred) identity(s) of possible individuals and/or entities with whom they are associated. It is, of course, important in this probability determination of rogueness of the source, to not only predict the probability of the entity and/or individual being the originating source of the data, but also what is the associated probability of such individual or entity possessing certain characteristics which themselves comprise an estimated degree of rogueness which can be predicted for its associated data.

In an even more advanced variation of the present scheme, it may even be possible to develop a rule-based scheme for probabilistic analysis of a piece of content based upon relatively comprehensive analyses and custom rules which assess the typical and semantic language style characteristics and (importantly) deep conceptual meanings which could be indicative of potential scams (which, for example, take into consideration, factors such as degree of financial opportunity presented, ease of attaining the associated financial rewards, areas in which individual might be particularly interested improperly or erroneously informed or gullible as well as other motivations, intentions or psychological factors common to the domain of public persuasion), which might motivate a scam artist to contrive such a scam based upon his/her thought processes as well as potential expected rewards and the structure of previously successful scams.

Few highlights and key thoughts.

1. The national security application incorporates many of the same functional feature of the scan detector.

2. At a high (diagrammatic) level a system security adaptive learning based approach in accordance with the invention utilizes a rather broad range of inputs which include, for example:

a. Code analysis;

b. Behavior analysis, such as sequence of system behaviors that may be internal or external to the system or of external thus attempting to counteract its own counter measure for detection (i.e, vis-à-vis mutation).

b. The "dead ringer's" scenario (code emulation code)— another important countermeasure attempted by the clever virus is attempt to assimilate all of the fundamental structural (code sequences) and functional characteristics of the surrounding code in which it is embedded in order to make:

i. Its code presence more invisible and thus less detectable;

ii. Its functional behavior less detectable (from that of the authentic code's functionality).

c. The "dead ringer's scenario (code emulating humans)— The clever virus may further attempt to create a simulation model of the functional aspects of semantic language and even a simulation model of specific human beings and moreover, those of actively communicating humans (e.g., citing the case of an email intended to congratulate one's boss but instead it may be laced with insults). Likewise, if semantic models of specific humans can be created to the extent of passing the Turing test and thus disrupting human personal and business relationships and processes then almost all other types of human behaviors could be equally readily simulated.

Practical Considerations—The virus's ability to acquire complete knowledge about the surrounding code should not be underestimated.

a. One practical consideration is that such viruses can readily observe explicit behavior of the surrounding code in which it is embedded and it would appear to be the case that it could also diffusely embed itself in such a way that its ability to scan the structure of surrounding code sequence could also be performed almost certainly in a completely stealth fashion (thus emphasizing the need for analysis of behavior content and code).

b. Embed within the standard code itself some variation of the presently described scheme in metadata-type format which could perhaps function in very similar fashion to that which is presently herein, and perhaps use a decision tree to query the code sequence and its behavior as it begins to execute thus enabling the present system to detect problems, perhaps at an earlier state. Thus, instead of taking periodic "snapshots" of the code, numerous "snapshots" would be taken of it on a continual basis.

c. Steven Wolfram states that for many types of code it is possible to query and determine certain fundamental (high level) characteristics for even code which exhibits fairly complex forms of behavior). This would imply that the functional objectives or the present system's intrusion detection function could be ideally/optimally achieved by a hierarchical querying scheme such as a decision tree.

Because analysis of code, behavior and content is occurring, a statistical methodology would be very well suited in terms of its ability to capture and leverage a wide variety of types of feature-based statistical inputs. The invention is further characterized by techniques that are capable of detecting non-linear as well as standard linear relationships (using, for example, non-linear kernal regression method). Specifically, patterns of complex code sequences are linear, however, the characteristics of the actions, elicited directly therefrom, correlate with them in non-linear fashion Likewise, sequences of actions (more complex behavior) will likely correlate non-linearly as will content features of text or spoken language.

Other Design Considerations, Practical Problems/Issues and their Associated Technical Approaches, Applications, Etc a. Applying Techniques That are Cited by Stephen Wolfram—

One of the interesting and practically relevant experimental observations made by Stephen Wolfram in his book, "A New Kind of Science" is the fact that for the vast preponderance of software code (generally speaking) which exhibits demonstrably, complex behavior, the underlying rule set which governs that particular code is remarkably simply in nature. This presents an opportunity by which this simplicity can be exploited to the advantage of an observer who can pose certain queries about the fundamental nature and characteristics of the code and how it is likely to behave under various conditions. Although these queries and their associated answers may be (and usually are) limited to a general and non-specific level, it is conceivable that one could develop an algorithm which is designed to query and retrieve information about other code (which is vulnerable to infection by rogue viruses) or even, to some much more limited extent, to the "software" underlying the behavior of biological agents (i.e., hackers) to the extent that their simulation model can reduce their behavior and underlying motivational objectives to that of a computerized simulation model. The functional design objectives of such a system would likely be divided into two components:

i. A purely observational (passive) feedback based component;

ii. A response based approach by which certain behaviors are elicited based upon certain system-generated queries which elicit the behavioral response. It is reasonable in this approach to apply a decision tree which preferentially selects dynamically and reconfigurably selective environmental system conditions and/or stimuli to which the code is subjected in order to rapidly acquire the most relevant and informative information possible based upon the present collection of knowledge known about the entity at the time of each respective stimulus.

Trusted Server

Different servers or databases can benefit from sharing and exchanging information with one another about attacks. Suppose that a server is attacked by a virus. That server can benefit other servers by publishing how that virus penetrated into the system (a particular email message or a web sight for example). Yet if the server were to publish this information, the server gives away the information that he was attacked by a virus. Such information can be damaging to the server. Therefore, the Server would like to keep such information privately. However each server would benefit from warnings of what the viruses look like before the server is attacked. This way the server can avoid reading certain emails or accessing certain web sights.

One way for the servers to share information about attacks securely without revealing information about themselves is to use a Trusted Server. The trusted server will be a paid server different from the others. The only purpose of the Trusted Server is to help the other servers communicate with one another without revealing information about themselves. The Trusted Server is chosen in such a way that it is trusted by all other servers. In other words, the Trusted server should have no motivation to harm the privacy of any of the other servers.

The protocol for the Trusted Server would be the following: (1) Each server sends to the Trusted Server the attack information available to it, (2) The Trusted Server then gathers this information and sends the warnings to the servers. This way none of the servers except for the trusted server know where the information is coming form and which server was attacked.

The trusted server has to ensure that it does not distribute false information to the other servers. This can happen when an adversary can pretend to be a server that was attacked by a virus and pass misleading information onto the other servers. This could cause some servers to avoid reading important emails that are not harmful at all.

There are several ways to avoid this.

First, the Trusted server (TS) can request to see the emails of the servers. This way the TS can run them on some machine and see the results. The TS can choose to run each with some probability. This way the chance of finding the adversary are large, yet the work that the TS has to do is minimized.

Second, the TS can decide to announce only those warning that arrive from several servers above some threshold. This threshold can be determined based on the application. If the servers are willing to get more warning than the threshold will be low. If on the other hand, they want to make sure that the warnings they are getting are real threats then the threshold can be high. For this to work, the servers can report anything that looks different than usual on their machine. That is, if they receive an email from an unknown party they can report it to the trusted server before opening it. If the TS notices that many servers got that email, then the TS sends a warning. If a server does not get a warning, then they can assume that it is not likely to be a wide spread virus.

Third, the TS can only use the "reputation" of the servers in deciding whether to broadcast their warnings or not. Each server can come into the network with a certain good reputation that is recommended by another network. Another alternative is for a server to build its reputation from scratch depending on the behavior which is judged by the TS. Thus, servers which only send helpful warnings will gain good reputation and more of their warnings will be broadcasted. On the other hand, and adversary can lose its reputation once and be prevented from disrupting the network again.

The Trusted server can also create honey pots in order to track the adversary. In this case a honey pot would be a trap that would cause the adversary to disclose himself because he claim some warning about a virus was true.

Redundancy

Redundant memory/hardware and associated processing capacity can be kept insulated from the infected and/or corrupted portions of the system. This can be done by keeping two copies of the system one would be "active" and online. The other would be stored as a backup which is not used. However the backup will be an exact copy of the original so that it can replace the original in a modular way. The replacing can be done during off peak hours. When the "active" system is replaced by the redundant one they need to be compared for their differences. This has to be done for two reasons. First the redundant system has to be updated to become up to date as the "active" system was. Presumably there are many changes that occurred through the active time. Second, this difference check can also aid in discovering attacks. This is especially so in systems that do not have many changes during one time. Or that have changes that are predictable and always of the same type. Therefore, when the active system is exchanged with the redundant one, only the non virus changes will be transferred.

Trusted Server and Statistical Analysis

There are a few ways to detect which are the harmful virus changes that are made to a system. One is via an interaction with a Trusted Server as was described above. The other is by keeping a statistical record on the behavior of the system. The kind of changes usually made. Important components of the analysis would include amount and type of changes. A list of changes that accompany a particular change. A list of changes that were found to be harmful in the past.

In addition, the information obtain from the Trusted server will also help in refining the statistical analysis. The trusted server can give a clue as to which patterns to look for in the data which would help reduce the search size considerably.

The invention claimed is:

1. A system that detects the state of a computer network, comprising:
   a plurality of distributed agents disposed in said computer network, each said distributed agent comprising:
   data collection means for passively collecting, monitoring, and aggregating data representative of activities of respective nodes within said computer network;
   means responsive to the data from the data collection means for analyzing said data to develop activity models representative of activities of said computer network in a normal state and activities of said computer network in an abnormal state as a result of intrusions, infections, scams and/or other suspicious activities in said computer network; and
   means for comparing collected data to said activity models to determine whether said computer network is in said normal state or said abnormal state at different times and to dynamically update said activity models based on said collected data,
   wherein said analyzing means performs a pattern analysis on the collected data to identify patterns in the collected data representative of suspicious activities and said comparing means compares the results of the pattern analysis of data collected by an agent to the results of pattern analysis of data collected by analyzing means of other agents to identify similar patterns of suspicious activity in different portions of the computer network.

2. The system of claim 1, wherein said data collection means collects data representative of operation of said computer network, including respective nodes in said computer network, said data relating to communications, internal and external accesses, code execution functions, and/or network resource conditions of respective nodes in said computer network.

3. The system of claim 1, wherein said activity models characterize conditions within said computer network including behaviors, events, and/or functions of respective nodes of said computer network, said behaviors representative of said normal state and one or more abnormal states representative of suspicious activity in said computer network.

4. The system of claim 1, further comprising means for characterizing the state of the computer network and identifying any potential threats based on said collected data.

5. The system of claim 4, wherein said characterizing means further recommends remedial repair and/or recovery strategies to isolate and/or neutralize the identified potential threats to the computer system.

6. The system of claim 1, wherein respective agents are connected by redundant communications connections.

7. The system of claim 1, wherein each agent is implemented in redundant memory and hardware that is adapted to be insulated from infected components of said computer network.

8. The system of claim 1, wherein the agents are disposed in a hierarchical structure whereby communications from bottom level agents to agents at higher levels in the hierarchy are limited.

9. The system of claim 1, further comprising means for predictively modeling the behavior of said computer network based on sequentially occurring behavior patterns in the data collected by said data collection means.

10. The system of claim 1, wherein said comparing means comprises means for pattern matching collected data with data in said activity models to determine a closest activity model based upon similarity of the data in each data model with the collected data.

11. The system of claim 1, wherein the collected data represents actions of a virus, system responses to actions of a virus, actions of a hacker, system responses to actions of a hacker, threats directed to discrete objects in said computer network, and/or potential triggers of a virus or threat to said computer network.

12. The system of claim 1, wherein said analyzing means for each agent filters and analyzes received data and dynamically redistributes the analyzed and filtered data to other agents associated with said each agent.

13. The system of claim 1, wherein the comparing means compares names and email addresses in said collected data against known criminal, hoaxsters and/or aliases for known criminals and hoaxsters.

14. The system of claim 1, further comprising a trusted server that receives attack data from a plurality of agents identifying abnormal states indicative of a network attack, said trusted server gathering the attack data and sending warnings to selected nodes in said computer network.

15. A method of detecting the state of a computer network, comprising:
   providing a plurality of distributed agents disposed in said computer network to passively collect, monitor, and aggregate data representative of activities of respective nodes within said computer network;

analyzing said data to develop activity models based on collected data and representative of activities of said network in a normal state and activities of said computer network in an abnormal state as a result of intrusions, infections, scams and/or other suspicious activities in said computer network, said data analysis including performing a pattern analysis on the collected data to identify patterns in the collected data representative of suspicious activities; and comparing collected data to said activity models to determine whether said computer network is in said normal state or said abnormal state at different times and to dynamically update said activity models, said comparing including comparing the results of the pattern analysis of data collected by an agent to the results of pattern analysis of data collected by other agents to identify similar patterns of suspicious activity in different portions of the computer network.

16. The method of claim 15, wherein the agents report any suspicious activity that exceeds a suspicion threshold.

17. The method of claim 16, wherein the agents transmit said analyzed data in order to determine an origin of the suspicious activity in the computer network.

18. The method of claim 17, further comprising scanning said analyzed data for patterns and comparing said patterns to data representative of patterns of known threats to said computer network for identification of said suspicious activity.

* * * * *